US012384653B2

(12) United States Patent
Hasegawa et al.

(10) Patent No.: US 12,384,653 B2
(45) Date of Patent: Aug. 12, 2025

(54) INFORMATION PROCESSING APPARATUS, INFORMATION PROCESSING SYSTEM, NON-TRANSITORY COMPUTER READABLE MEDIUM, AND INFORMATION PROCESSING METHOD

(71) Applicant: TOYOTA JIDOSHA KABUSHIKI KAISHA, Toyota (JP)

(72) Inventors: Hideo Hasegawa, Nagoya (JP); Yurika Tanaka, Yokosuka (JP); Satoshi Komamine, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1029 days.

(21) Appl. No.: 17/407,022

(22) Filed: Aug. 19, 2021

(65) Prior Publication Data

US 2022/0055860 A1 Feb. 24, 2022

(30) Foreign Application Priority Data

Aug. 19, 2020 (JP) ................................ 2020-138955

(51) Int. Cl.

| | |
|---|---|
| ***B66B 1/34*** | (2006.01) |
| ***G06Q 50/40*** | (2024.01) |
| ***G08G 1/00*** | (2006.01) |

(52) U.S. Cl.

CPC ........... *B66B 1/3461* (2013.01); *G06Q 50/40* (2024.01); *G08G 1/202* (2013.01); *B66B 2201/211* (2013.01); *B66B 2201/214* (2013.01); *B66B 2201/215* (2013.01); *B66B 2201/222* (2013.01); *B66B 2201/232* (2013.01); *B66B 2201/402* (2013.01)

(58) Field of Classification Search

CPC ... B66B 1/2408; B66B 1/14; B66B 2201/211; B66B 2201/214; B66B 2201/215; B66B 2201/222; B66B 2201/232; B66B 2201/402; B66B 2201/103; B66B 1/3461; G08G 1/123; G08G 1/096833

See application file for complete search history.

(56) References Cited

U.S. PATENT DOCUMENTS

| | | | | |
|---|---|---|---|---|
| 2017/0147951 | A1* | 5/2017 | Meyer | G06Q 50/14 |
| 2019/0163204 | A1* | 5/2019 | Bai | G06Q 10/047 |
| 2020/0223284 | A1 | 7/2020 | Hoshino et al. | |
| 2021/0110706 | A1* | 4/2021 | Graefe | G01C 21/206 |

FOREIGN PATENT DOCUMENTS

| | | | |
|---|---|---|---|
| CN | 107265219 | A | 10/2017 |
| CN | 111422023 | A | 7/2020 |
| JP | 2016-108074 | A | 6/2016 |
| JP | 2016-160079 | A | 9/2016 |

OTHER PUBLICATIONS

Nakata et al., Elevator Management System and Elevator Management Method, Sep. 5, 2016, EPO, JP 2016-160079 A, Machine Translation of Description (Year: 2016).*

* cited by examiner

*Primary Examiner* — James A English
(74) *Attorney, Agent, or Firm* — Oliff PLC

(57) ABSTRACT

An information processing apparatus includes a controller configured to predict a state of congestion of an elevator installed in a building and generate, based on the predicted state of congestion, a proposal message to propose a departure time for the building to a user planning to travel to the building.

10 Claims, 6 Drawing Sheets

INFORMATION PROCESSING APPARATUS, INFORMATION PROCESSING SYSTEM, NON-TRANSITORY COMPUTER READABLE MEDIUM, AND INFORMATION PROCESSING METHOD

CROSS-REFERENCE TO RELATED APPLICATION

This application claims priority to Japanese Patent Application No. 2020-138955, filed on Aug. 19, 2020, the entire contents of which are incorporated herein by reference.

TECHNICAL FIELD

The present disclosure relates to an information processing apparatus, an information processing system, a program, and an information processing method.

BACKGROUND

In a building where an elevator is installed, the waiting time from when a user calls the elevator until the elevator arrives may grow long when many users are using the elevator.

Technology for reducing this waiting time for the elevator is known. For example, patent literature (PTL) 1 discloses technology, for a building in which a plurality of elevators is installed, to predict the traffic demand for the elevators on each floor based on the amount of power used on each floor or the change in this amount and perform group management control of the elevators based on this prediction.

CITATION LIST

Patent Literature

PTL 1: JP 2016-108074 A

SUMMARY

There is room for improvement in technology to reduce the waiting time for an elevator installed in a building.

It would be helpful to improve technology to reduce the waiting time for an elevator installed in a building.

An information processing apparatus according to the present disclosure includes a controller configured to:

predict a state of congestion of an elevator installed in a building; and generate, based on the predicted state of congestion, a proposal message to propose a departure time for the building to a user planning to travel to the building.

A program according to the present disclosure is configured to cause a computer to perform operations including:

predicting a state of congestion of an elevator installed in a building; and generating, based on the predicted state of congestion, a proposal message to propose a departure time for the building to a user planning to travel to the building.

An information processing method according to the present disclosure is an information processing method for an information processing apparatus and includes:

predicting a state of congestion of an elevator installed in a building; and generating, based on the predicted state of congestion, a proposal message to propose a departure time for the building to a user planning to travel to the building.

The present disclosure can improve technology to reduce the waiting time for an elevator installed in a building.

DETAILED DESCRIPTION

Embodiments of the present disclosure are described below with reference to the drawings.

Figure 1:
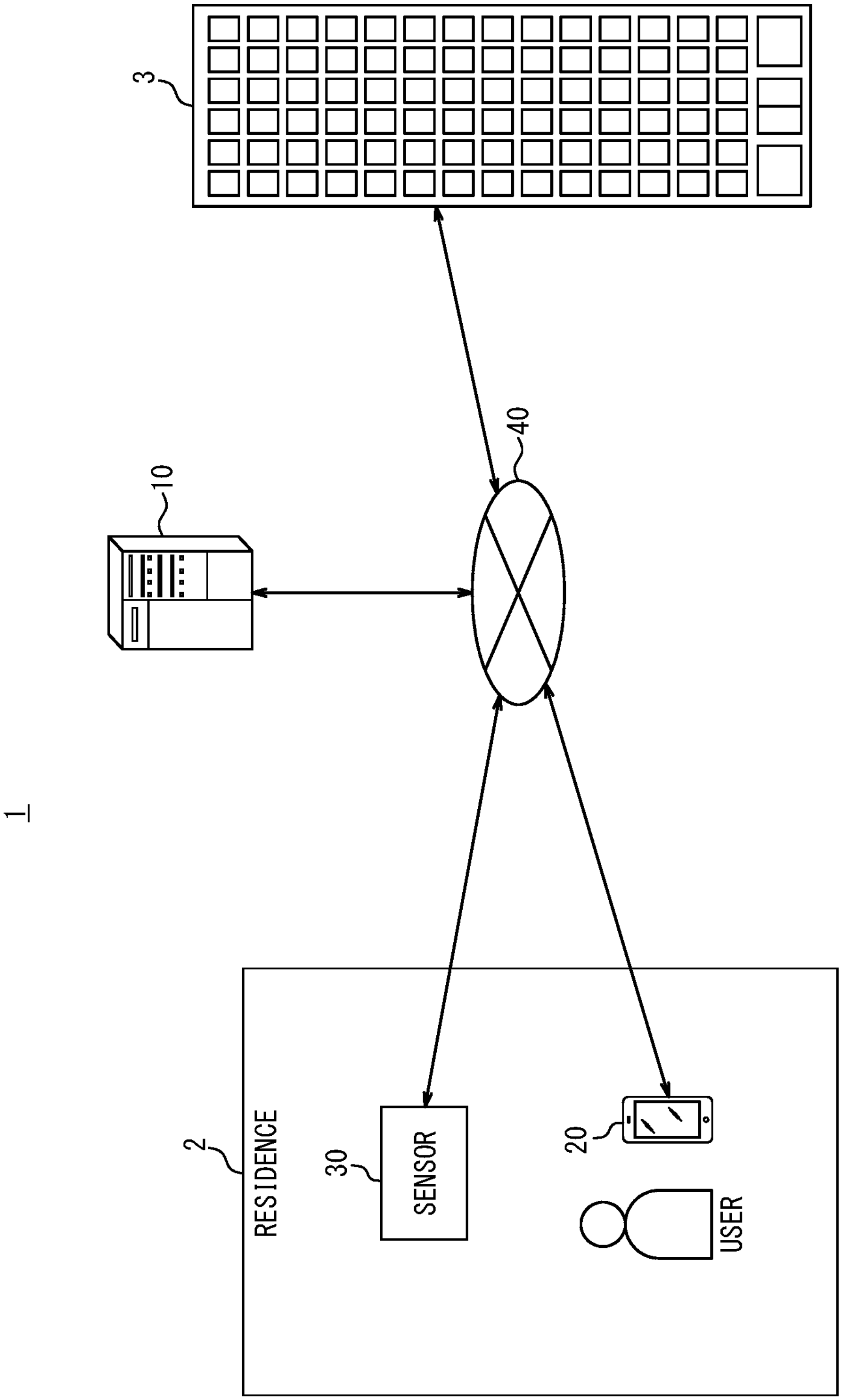
FIG. 1 is a diagram illustrating a configuration of an information processing system according to an embodiment of the present disclosure.

FIG. 1 is a diagram illustrating a configuration of an information processing system 1 according to an embodiment of the present disclosure. With reference to FIG. 1, a configuration and outline of the information processing system 1 according to an embodiment of the present disclosure are described.

The information processing system 1 includes an information processing apparatus 10, a terminal apparatus 20, and a sensor 30. The information processing apparatus 10, the terminal apparatus 20, and the sensor 30 are communicably connected via a network 40. The network 40 may be a network including a mobile communication network, the Internet, or the like.

In FIG. 1, one each of the information processing apparatus 10, the terminal apparatus 20, and the sensor 30 are illustrated, but the number of information processing apparatuses 10, terminal apparatuses 20, and sensors 30 may be two or more of each.

As illustrated in FIG. 1, the terminal apparatus 20 is a terminal apparatus owned by a user in a residence 2. The sensor 30 is also installed in the residence 2. In the present embodiment, the residence 2 is described as an example of a building, but the residence 2 may be another type of building.

A building 3 is a building in which an elevator is installed. The building 3 may, for example, be an office building. The building 3 is a building to which the user in the residence 2 plans to travel. The building 3 may, for example, be a building that includes the office where the user works. In this case, the user often goes to the building 3 at nearly the same time on workdays.

The information processing apparatus 10 is, for example, a dedicated computer configured to function as a server. The information processing apparatus 10 may be a general purpose personal computer (PC).

The information processing apparatus 10 can communicate with the terminal apparatus 20 and the sensor 30 via the network 40. The information processing apparatus 10 predicts the state of congestion of the elevator in the building 3. Based on the predicted state of congestion of the elevator, the information processing apparatus 10 generates a proposal message that proposes a departure time for the building 3 to a user planning to travel to the building 3. The information processing apparatus 10 transmits the generated proposal message to the terminal apparatus 20.

The terminal apparatus 20 can communicate with the information processing apparatus 10 via the network 40. The terminal apparatus 20 is a terminal apparatus owned by a user in the residence 2. The terminal apparatus 20 receives the proposal message from the information processing apparatus 10. The terminal apparatus 20 outputs the received proposal message. The terminal apparatus 20 may output the proposal message as an image or as audio. Prior to outputting the proposal message, the terminal apparatus 20 may vibrate the entire terminal apparatus 20 to direct the user's attention to the terminal apparatus 20. The terminal apparatus 20 may, for example, be a smartphone or tablet.

The sensor 30 can communicate with the information processing apparatus 10 via the network 40. The sensor 30 continually detects an action of the user in the residence 2. The sensor 30 transmits the detected action data on the user to the information processing apparatus 10. The sensor 30 may, for example, be a camera, a microphone, or a smart toothbrush.

Figure 2:
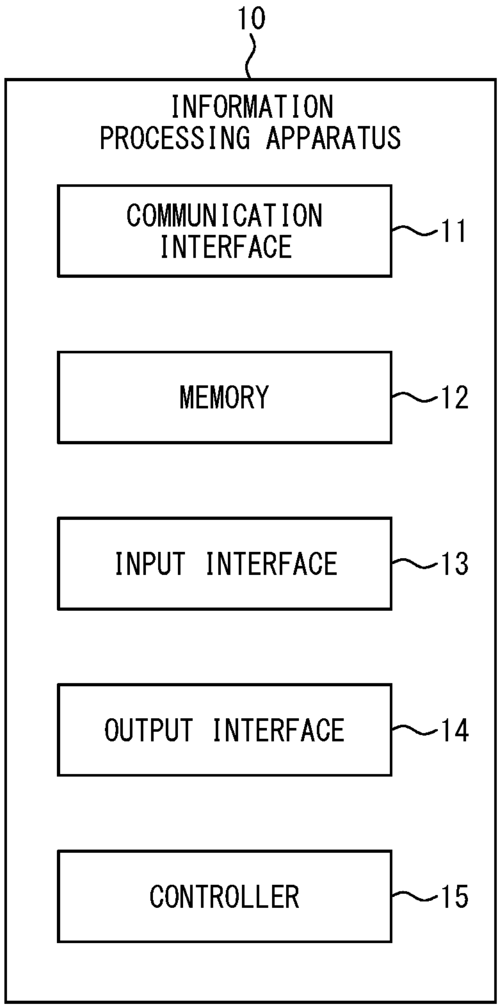
FIG. 2 is a block diagram illustrating a configuration of an information processing apparatus according to an embodiment of the present disclosure.

With reference to FIG. 2, the configuration of the information processing apparatus 10 according to an embodiment of the present disclosure is described.

The information processing apparatus 10 includes a communication interface 11, a memory 12, an input interface 13, an output interface 14, and a controller 15.

The communication interface 11 includes a communication module that connects to the network 40. For example, the communication interface 11 may include a communication module compliant with a local area network (LAN). In an embodiment, the information processing apparatus 10 is connected to the network 40 via the communication interface 11. The communication interface 11 transmits and receives various information via the network 40. The communication interface 11 can communicate with the terminal apparatus 20 and the sensor 30 via the network 40.

The memory 12 is, for example, a semiconductor memory, a magnetic memory, an optical memory, or the like, but is not limited to these. The memory 12 may, for example, function as a main memory, an auxiliary memory, or a cache memory. The memory 12 stores any information used for operations of the information processing apparatus 10. For example, the memory 12 may store a system program, an application program, various types of information received by the communication interface 11, and the like. The information stored in the memory 12 may, for example, be updated with information received from the network 40 via the communication interface 11. A portion of the memory 12 may be installed externally to the information processing apparatus 10. In this case, the externally installed portion of the memory 12 may be connected to the information processing apparatus 10 via any appropriate interface.

The input interface 13 includes one or more interfaces for input to detect user input and acquire input information based on user operations. For example, the input interface 13 includes, but is not limited to, a physical key, a capacitive key, a touch screen integrally provided with a display of the output interface 14, or a microphone that accepts audio input.

The output interface 14 includes one or more interfaces for output to output information and notify the user. For example, the output interface 14 includes, but is not limited to, a display for outputting information as images or a speaker for outputting information as audio.

The controller 15 includes at least one processor, at least one dedicated circuit, or a combination thereof. The processor is a general purpose processor, such as a central processing unit (CPU) or a graphics processing unit (GPU), or a dedicated processor specialized for a particular process. The dedicated circuit is, for example, a field-programmable gate array (FPGA) or an application specific integrated circuit (ASIC). The controller 15 executes processing related to operations of the information processing apparatus 10 while controlling each component of the information processing apparatus 10.

Figure 3:
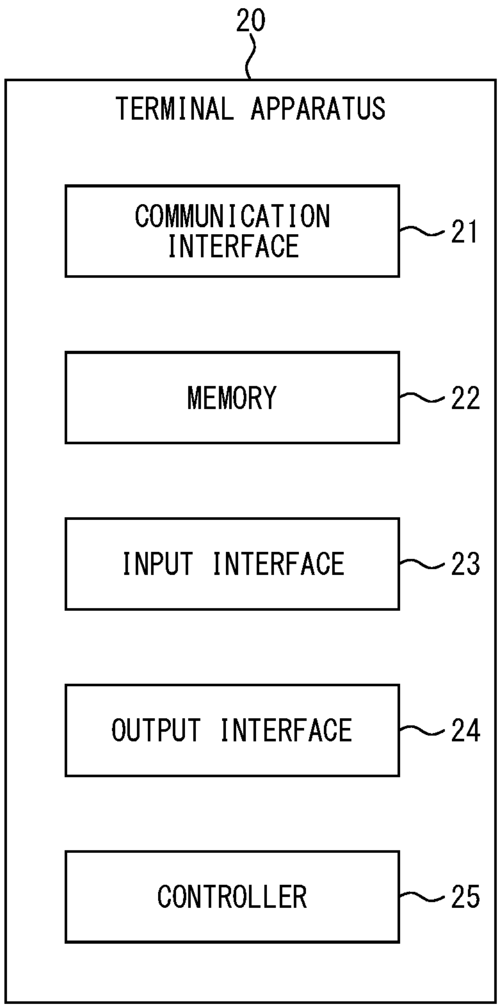
FIG. 3 is a block diagram illustrating a configuration of a terminal apparatus according to an embodiment of the present disclosure.

With reference to FIG. 3, the configuration of the terminal apparatus 20 according to an embodiment of the present disclosure is described.

The terminal apparatus 20 includes a communication interface 21, a memory 22, an input interface 23, an output interface 24, and a controller 25.

The communication interface 21 includes a communication module that connects to the network 40. For example, the communication interface 21 may include a communication module compliant with a mobile communication standard such as LTE, 4G, and 5G. In an embodiment, the terminal apparatus 20 is connected to the network 40 via the communication interface 21. The communication interface 21 transmits and receives various information via the network 40. The communication interface 21 can communicate with the information processing apparatus 10 via the network 40.

The memory 22 is, for example, a semiconductor memory, a magnetic memory, an optical memory, or the like, but is not limited to these. The memory 22 may, for example, function as a main memory, an auxiliary memory, or a cache memory. The memory 22 stores any information used for operations of the terminal apparatus 20. For example, the memory 22 may store a system program, an application program, various types of information received by the communication interface 21, and the like. The information stored in the memory 22 may, for example, be updated with information received from the network 40 via the communication interface 21. A portion of the memory 22 may be installed externally to the terminal apparatus 20. In this case, the externally installed portion of the memory 22 may be connected to the terminal apparatus 20 via any appropriate interface.

The input interface 23 includes one or more interfaces for input to detect user input and acquire input information based on user operations. For example, the input interface 23 is a physical key, a capacitive key, a touch screen integrally provided with a display of the output interface 24, a microphone that accepts audio input, or the like, but is not limited to these.

The output interface 24 includes one or more interfaces for output to output information and notify the user. For example, the output interface 24 includes, but is not limited to, a display for outputting information as images or a speaker for outputting information as audio.

The controller 25 includes at least one processor, at least one dedicated circuit, or a combination thereof. The processor is a general purpose processor, such as a CPU or GPU, or a dedicated processor specialized for a particular process. The dedicated circuit is, for example, an FPGA or an ASIC. The controller 25 executes processing related to operations of the terminal apparatus 20 while controlling each component of the terminal apparatus 20.

Operations of Information Processing System

Operations of the information processing system 1 illustrated in FIG. 1 are described with reference to FIGS. 1 to 3.

The building 3 is a building to which the user in the residence 2 plans to travel. An elevator is installed in the building 3. The building 3 may, for example, be an office building that includes the office where the user works. The building 3 is described below as being the place where the user works.

The controller 15 of the information processing apparatus 10 predicts the state of congestion of the elevator installed in the building 3. The "elevator installed in the building 3" is also simply referred to below as the "elevator". The state of congestion of the elevator may be represented by a "degree of congestion", which is a predetermined index. The degree of congestion may be any appropriate index, such as the time assumed to be required from when the elevator is called until the elevator arrives or the number of people assumed to be using the elevator.

The controller 15 predicts the state of congestion of the elevator based on information on an event scheduled to take place in the building 3 and/or a history of the past state of congestion of the elevator.

The controller 15 may, for example, acquire various types of event-related information for the event scheduled to take place in the building 3 from scheduling information of an employee working in an office in the building 3. As the event-related information, the controller 15 may, for example, acquire information on the content of the event, the time when the event takes place, the number of people attending the event, and the like from the scheduling information of the employee.

The controller 15 may, for example, acquire scheduling information of the employee from a server that stores data of a scheduling application used by the employee.

For example, when acquiring information that a conference with 100 participants from outside the company is being held at 10 o'clock in the building 3, the controller 15 predicts the state of congestion of the elevator to be such that the elevator is more congested than normal from 9:30 to 10 o'clock.

The controller 15 may, for example, acquire information on a history of the past state of congestion of the elevator from a server that stores historical data of the state of congestion of the elevator. The controller 15 may predict the state of congestion of the elevator for each time slot of each day of the week based on the history of the past state of congestion of the elevator.

The memory 12 stores information such as the workdays of the user, the time slot the user reports to work, and the commute time of the user. The workdays of the user are information on which days the user goes to work. The time slot the user reports to work is a time range in which the user should arrive at the building 3 for work. The commute time of the user is the time it takes for the user to travel from the residence 2 to the building 3 when reporting to work. These pieces of information may, for example, be information inputted by the user to the terminal apparatus 20, transmitted, and stored by the controller 15 in the memory 12.

As the workdays of the user, the memory 12 may, for example, store information indicating Monday through Friday. As the time slot the user reports to work, the memory 12 may, for example, store information indicating 8 o'clock to 10:00 o'clock. As the commute time of the user, the memory 12 may, for example, store information indicating 10 minutes.

The controller 15 predicts the congestion status of the elevator on workdays of the user when the current time is a predetermined amount of time before the time at which it is predicted that the user will depart the residence 2 to report to work at the building 3. The predetermined amount of time may, for example, be 1 hour.

The controller 15 may predict the state of congestion of the elevator for the entire time slot in which the user may report to work or may predict the state of congestion of the elevator in a time slot near the time at which the user is predicted to arrive at the building 3.

For example, when the time at which the user is predicted to depart the residence 2 is 9 o'clock, the controller 15 predicts the state of congestion of the elevator on that day at 8 o'clock, which is the predetermined amount of time before 9 o'clock. The controller 15 predicts the state of congestion of the elevator in a time slot near the time at which the user is predicted to arrive at the building 3, for example. The controller 15 may predict the state of congestion of the elevator at predetermined time intervals. The controller 15 may, for example, predict the state of congestion of the elevator at 5 minute intervals. In this case, the controller 15 predicts the state of congestion of the elevator from 9:00 to 9:05, the state of congestion from 9:05 to 9:10, . . . , and the state of congestion from 9:55 to 10:00, for example.

Based on the predicted state of congestion of the elevator, the controller 15 generates a proposal message that proposes a departure time for the building 3 to the user. The controller 15 calculates the departure time included in the proposal message so that the user can arrive at the building 3 at a time when the degree of congestion of the elevator is small. The controller 15 calculates the departure time included in the proposal message by subtracting the commute time of the user from the time when the degree of congestion of the elevator is small. As the time when the degree of congestion of the elevator is small, the controller 15 may select the time with the smallest degree of congestion from 8 o'clock to 10 o'clock, which is the time slot the user reports to work, or may select a time with a small degree of congestion in the time slot near the time when the user is predicted to arrive at the building 3.

The controller 15 may generate the proposal message so that the proposed departure time is included as is, or may generate the proposal message so as to include a message proposing to change the departure time. When generating a proposal message so that the departure time is included as is, the controller 15 may, for example, generate a proposal message such as "If you leave home at 7:30, the elevator is likely not to be crowded". When generating a proposal message so as to include a message proposing to change the departure time, the controller 15 may, for example, generate a proposal message such as "If you delay your departure time by 15 minutes, the elevator is likely not to be crowded".

The controller 15 transmits the generated proposal message to the terminal apparatus 20 via the communication interface 11.

The communication interface 21 of the terminal apparatus 20 receives the proposal message transmitted by the information processing apparatus 10.

The controller 25 acquires the proposal message, transmitted by the information processing apparatus 10, via the communication interface 21.

The controller 25 causes the output interface 24 to output the proposal message. The controller 25 may cause the output interface 24 to display the proposal message as an image or may cause the output interface 24 to output the proposal message as audio.

Figure 4:
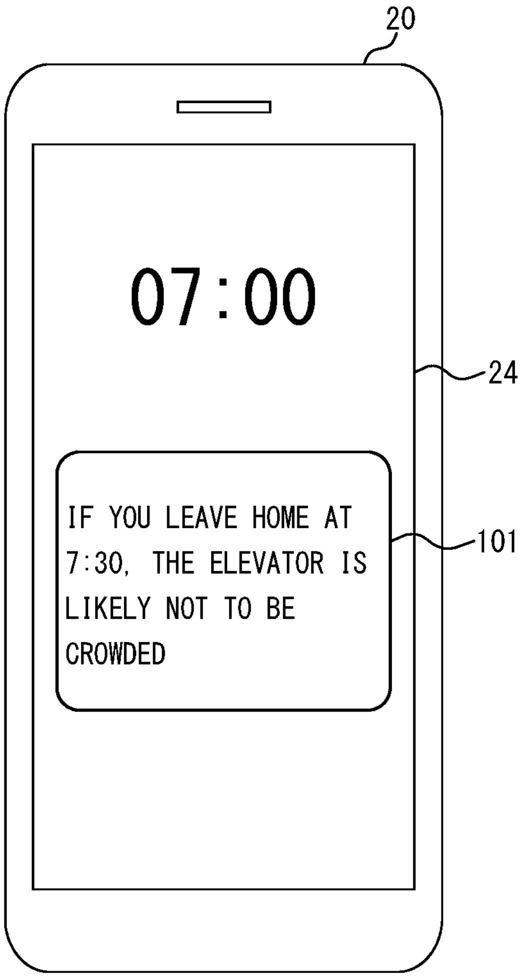
FIG. 4 illustrates an example of a proposal message.

FIG. 4 illustrates an example in which the terminal apparatus 20 causes the output interface 24 to display a proposal message 101 stating "If you leave home at 7:30, the elevator is likely not to be crowded". If the user who sees this proposal message departs from the residence 2 at 7:30 to report to work at the building 3, the user can arrive at the building 3 at a time when the degree of congestion of the elevator is predicted to be small. Accordingly, the time that the user waits for the elevator can be reduced.

Prediction of Departure Time

The controller 15 of the information processing apparatus 10 may predict the departure time of the user for the building 3 based on an action of the user in the residence 2 and generate the proposal message based on the predicted departure time. Operations of the information processing system 1 for when the controller 15 predicts the departure time of the user for the building 3 are described below.

The sensor 30 continually detects an action of the user in the residence 2. The sensor 30 transmits the detected action data on the user to the information processing apparatus 10. For example, if the sensor 30 is a camera, the sensor 30 continually captures images of the user in the residence 2. The sensor 30 transmits the captured image data to the information processing apparatus 10 as action data on the user. For example, if the sensor 30 is a microphone, the sensor 30 continually detects an utterance of the user in the residence 2. The sensor 30 transmits the detected audio data to the information processing apparatus 10 as action data on the user. For example, if the sensor 30 is a smart toothbrush and is used by the user in the residence 2 to brush teeth, the sensor 30 transmits the length of time the toothbrush was used to the information processing apparatus 10 as action data on the user.

The communication interface 11 of the information processing apparatus 10 receives the action data on the user transmitted by the sensor 30. The controller 15 acquires the action data on the user, transmitted by the sensor 30, via the communication interface 11. Based on the acquired action data, the controller 15 predicts the departure time when the user will depart for the building 3. For example, upon acquiring action data that the user has brushed his or her teeth, the controller 15 predicts that the departure time of the user for the building 3 is 30 minutes after the end of the toothbrushing.

The controller 15 accumulates the action data in the memory 12 by storing the action data on the user acquired in the past in the memory 12 in association with the time. The controller 15 may refer to the relationship between the action data on the user accumulated in the memory 12 and the departure time at which the user previously departed for the building 3 and predict the departure time of the user for the building 3 based on the newly acquired action data.

Based on the predicted departure time, the controller 15 predicts the arrival time at which the user will arrive at the building 3. The controller 15 can predict the arrival time by adding the commute time of the user to the predicted departure time. The controller 15 refers to the information stored in advance in the memory 12 as the commute time of the user.

The controller 15 predicts the state of congestion of the elevator in the building 3 at the predicted arrival time. The controller 15 generates a proposal message to propose changing the departure time when the controller 15 determines that the predicted state of congestion of the elevator is equal to or greater than a predetermined degree of congestion. For example, if it is determined that delaying the departure time by 15 minutes would reduce the degree of congestion, the controller 15 generates a proposal message, "If you depart at 7:30, the elevator will be congested. I propose you delay your departure by 15 minutes". The controller 15 may also predict the state of congestion before and after the predicted arrival time and determine the proposed departure time based on the state of congestion at the predicted arrival time and the state of congestion before and after the predicted arrival time. The controller 15 may, for example, also predict the state of congestion 15 minutes and 30 minutes after the predicted arrival time and determine the least congested time as the proposed departure time.

The controller 15 transmits the generated proposal message to the terminal apparatus 20 via the communication interface 11.

The information processing apparatus 10 can generate a proposal message with more precise content by thus predicting the departure time of the user and then generating the proposal message based on the predicted departure time.

Pick-Up and Drop-Off by Vehicle

If the user commutes by vehicle, the controller 15 of the information processing apparatus 10 may generate a vehicle dispatch command instructing that a vehicle be dispatched to the user by the departure time at which the user departs from the residence 2. Operations of the information processing system 1 for when the controller 15 dispatches a vehicle by the departure time are described below.

Upon transmitting the proposal message to the terminal apparatus 20, the controller 15 of the information processing apparatus 10 generates a vehicle dispatch command instructing that a vehicle be dispatched to the user by the departure time proposed in the proposal message. The controller 15 may, for example, generate a vehicle dispatch command instructing that a vehicle be dispatched to the front of the residence 2 five minutes prior to the departure time proposed in the proposal message.

The vehicle that is dispatched to the user is an autonomously driven vehicle. The vehicle may be a Mobility as a Service (MaaS) dedicated vehicle.

The controller 15 may transmit the generated vehicle dispatch command to the vehicle directly or to a vehicle dispatch management server that manages dispatching of a plurality of vehicles. For example, if vehicle used by the user for commuting is a particular dedicated vehicle, the controller 15 may transmit the generated vehicle dispatch command directly to the dedicated vehicle. For example, if the vehicle used by the user for commuting is a vehicle among a plurality of vehicles managed by a vehicle dispatch management server, the controller 15 may transmit the generated dispatch command to the vehicle dispatch management server.

When dispatching a vehicle to the user, the controller 15 may generate the vehicle dispatch command after confirming that the user approves of departing at the departure time proposed in the proposal message. In this case, when the controller 15 acquires a message from the terminal apparatus 20, via the communication interface 11, indicating that the user approves of departing at the departure time proposed in the proposal message, the controller 15 generates the vehicle dispatch command to dispatch the vehicle to the user by the departure time.

By the controller 15 generating a vehicle dispatch command and dispatching a vehicle to the user by the departure time in this way, the user can board the vehicle automatically dispatched at the departure time and go to the building 3 where the user works, even without arranging the vehicle dispatch.

Figure 5:
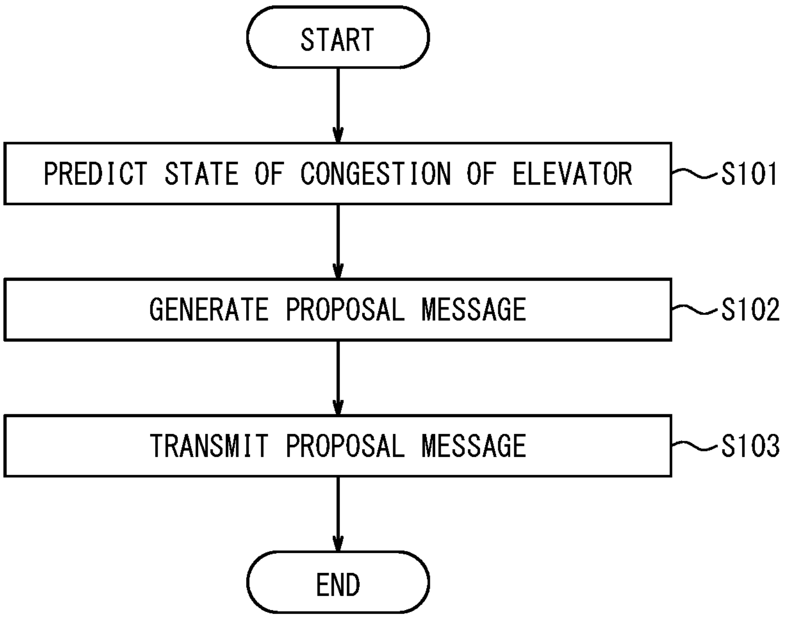
FIG. 5 is a flowchart illustrating operations of an information processing system according to an embodiment of the present disclosure.

Operations of the information processing system 1 are described with reference to the flowchart in FIG. 5.

In step S101, the controller 15 of the information processing apparatus 10 predicts the state of congestion of the elevator. The controller 15 predicts the state of congestion of the elevator based on information on an event scheduled to take place in the building 3 and/or a history of the past state of congestion of the elevator.

In step S102, based on the predicted state of congestion of the elevator, the controller 15 generates a proposal message that proposes a departure time for the building 3 to the user.

In step S103, the controller 15 transmits the generated proposal message to the terminal apparatus 20 via the communication interface 11. Upon receiving the proposal message, the terminal apparatus 20 outputs the received proposal message.

Figure 6:
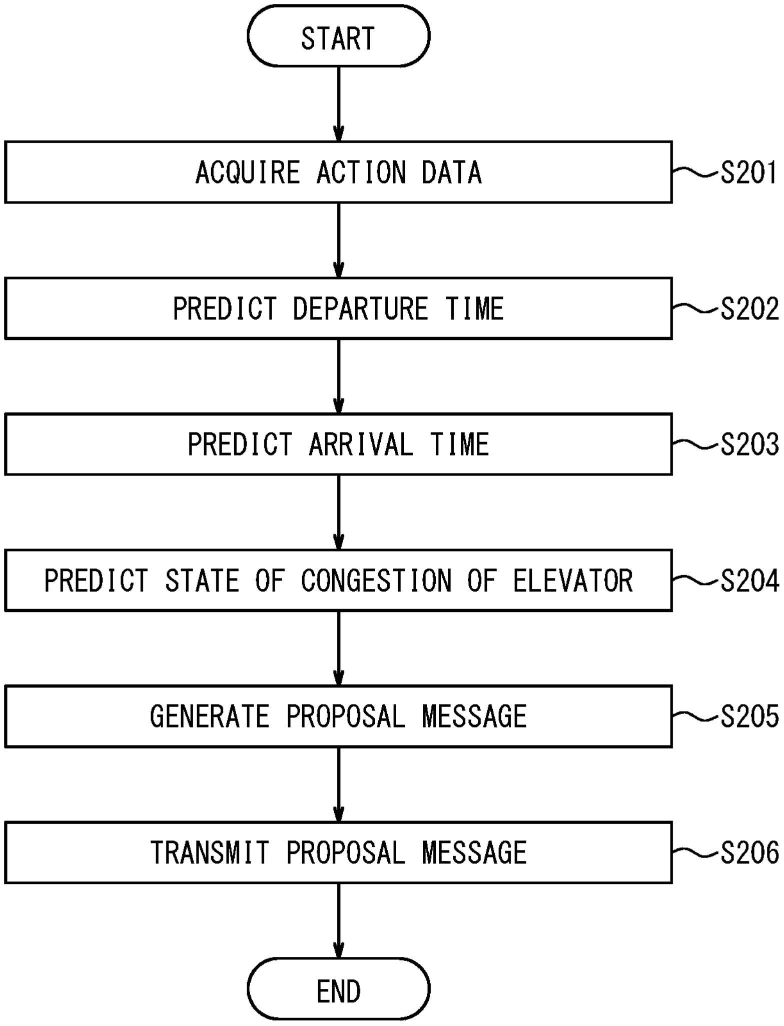
FIG. 6 is a flowchart illustrating operations of an information processing system according to an embodiment of the present disclosure.

Subsequently, with reference to the flowchart in FIG. 6, operations of the information processing system 1 for when the information processing apparatus 10 predicts the departure time of the user for the building 3 are described.

In step S201, the sensor 30 installed in the residence 2 continually detects an action of the user in the residence 2. The sensor 30 transmits the detected action data on the user to the information processing apparatus 10. The controller 15 of the information processing apparatus 10 acquires the action data on the user, transmitted by the sensor 30, via the communication interface 11.

In step S202, based on the acquired action data, the controller 15 predicts the departure time of the user for the building 3.

In step S203, based on the predicted departure time, the controller 15 predicts the arrival time at which the user will arrive at the building 3. The controller 15 can predict the arrival time by adding the commute time of the user to the predicted departure time.

In step S204, the controller 15 predicts the state of congestion of the elevator in the building 3 at the predicted arrival time. The controller 15 predicts the state of congestion of the elevator at the predicted arrival time based on information on an event scheduled to take place in the building 3 and/or a history of the past state of congestion of the elevator.

In step S205, based on the predicted state of congestion of the elevator, the controller 15 generates a proposal message that proposes a departure time for the building 3 to the user. The controller 15 generates a proposal message to propose delaying the departure time when, for example, the controller 15 determines that the predicted state of congestion of the elevator is equal to or greater than a predetermined degree of congestion.

In step S206, the controller 15 transmits the generated proposal message to the terminal apparatus 20 via the communication interface 11. Upon receiving the proposal message, the terminal apparatus 20 outputs the received proposal message.

As described above, in the information processing apparatus 10 according to the present embodiment, the controller 15 predicts the state of congestion of an elevator installed in the building 3 and generates, based on the predicted state of congestion, a proposal message to propose a departure time for the building 3 to a user planning to travel to the building 3. The user who has received such a proposal message on the terminal apparatus 20 and confirmed the proposal message outputted to the terminal apparatus 20 can adjust the departure time based on the proposal message to reduce the waiting time for the elevator upon arriving at the building 3. Therefore, the information processing apparatus 10 according to the present embodiment can improve technology to reduce the waiting time for an elevator installed in the building 3.

The present disclosure is not limited to the above-described embodiments. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, some processing operations performed in the information processing apparatus 10 in the above-described embodiment may be performed in the terminal apparatus 20 or the sensor 30.

For example, a general purpose electronic device, such as a smartphone or a computer, can also be configured to function as the information processing apparatus 10 according to the above-described embodiment. Specifically, a program describing the processing content for realizing the functions of the information processing apparatus 10 and the like according to the embodiment is stored in a memory of the electronic device, and the program is read and executed by the processor of the electronic device. Accordingly, the present disclosure can also be embodied as a program executable by a processor.

For example, the information processing apparatus 10 in the above-described embodiment may be installed in the residence 2.

In the above-described embodiment, the information processing apparatus 10 has been described as transmitting the proposal message to the terminal apparatus 20, and the terminal apparatus 20 as outputting the proposal message, but the proposal message may be outputted by an apparatus other than the terminal apparatus 20. For example, a speaker or smart speaker installed in the residence 2 may receive the proposal message from the information processing apparatus 10 and output the proposal message.

In the above-described embodiment, the user has been described as being in the residence 2, but the user need not be in the residence 2. The information processing apparatus 10 may transmit a proposal message to the terminal apparatus 20 of the user even if the user is not in the residence 2.

In the above-described embodiment, the case of the user departing the residence 2 has been described as an example, but the location from which the user departs may be a different location, other than the residence, where the user has stayed. The location where the user has stayed may, for example, be a another person's home, an office, a commercial facility, or the like. The location from which the user departs may be any appropriate location other than the building 3.

In the above-described embodiment, an example in which an autonomously driven vehicle is dispatched to the user has been described, but the vehicle that is dispatched to the user may be a vehicle driven by a driver.

The invention claimed is:

1. An information processing apparatus comprising a controller configured to:

receive action data on a user planning to travel from a first place where the user is present to a building including an elevator, the action data being detected by and transmitted from a sensor installed in the first place;

predict a departure time of the user from the first place based on the action data and a relationship between past action data on the user and a past departure time at which the user has previously departed from the first place for the building;

predict an arrival time of the user to the building based on the departure time;

predict a state of congestion of the elevator at the arrival time;

in response to determining that the state of congestion of the elevator at the arrival time is equal to or greater than a predetermined degree of congestion, generate a proposal message proposing a change of the departure time and indicating a proposed departure time;

transmit the proposal message to a terminal apparatus of the user;

in response to receiving from the terminal apparatus a message indicating approval of the proposed departure time, generate a vehicle dispatch command instructing that a vehicle be dispatched to the first place by the proposed departure time; and control, by transmitting the vehicle dispatch command to the vehicle, the vehicle to autonomously travel to the first place by the proposed departure time.

2. The information processing apparatus of claim 1, wherein the controller is configured to predict the state of congestion of the elevator based on an event that takes place in the building and/or a history of a past state of congestion of the elevator.

3. The information processing apparatus of claim 1, wherein the building is a place where the user works.

4. An information processing system comprising:

the information processing apparatus of claim 1; and a terminal apparatus of the user.

5. The information processing apparatus of claim 1, wherein the controller is further configured to acquire scheduling information of employees in the building and predict the state of congestion of the elevator based on a number of participants attending an event scheduled in the building.

6. A non-transitory computer readable medium storing a program configured to cause a computer to perform operations comprising:

receiving action data on a user planning to travel from a first place where the user is present to a building including an elevator, the action data being detected by and transmitted from a sensor installed in the first place;

predicting a departure time of the user from the first place based on the action data and a relationship between past action data on the user and a past departure time at which the user has previously departed from the first place for the building;

predicting an arrival time of the user to the building based on the departure time;

predicting a state of congestion of the elevator at the arrival time; and in response to determining that the state of congestion of the elevator at the arrival time is equal to or greater than a predetermined degree of congestion, generating a proposal message proposing a change of the departure time and indicating a proposed departure time;

transmitting the proposal message to a terminal apparatus of the user;

in response to receiving from the terminal apparatus a message indicating approval of the proposed departure time, generating a vehicle dispatch command instructing that a vehicle be dispatched to the first place by the proposed departure time; and controlling, by transmitting the vehicle dispatch command to the vehicle, the vehicle to autonomously travel to the first place by the proposed departure time.

7. The non-transitory computer readable medium of claim 6, wherein the predicting the state of congestion of the elevator includes predicting the state of congestion of the elevator based on an event that takes place in the building and/or a history of a past state of congestion of the elevator.

8. The information processing apparatus of claim 1, wherein the sensor comprises a smart toothbrush, and the controller is configured to predict the departure time based on a detected duration of toothbrush usage.

9. An information processing method for an information processing apparatus, the information processing method comprising:

receiving action data on a user planning to travel from a first place where the user is present to a building including an elevator, the action data being detected by and transmitted from a sensor installed in the first place;

predicting a departure time of the user from the first place based on the action data and a relationship between past action data on the user and a past departure time at which the user has previously departed from the first place for the building;

predicting an arrival time of the user to the building based on the departure time;

predicting a state of congestion of the elevator at the arrival time; and in response to determining that the state of congestion of the elevator at the arrival time is equal to or greater than a predetermined degree of congestion, generating a proposal message proposing a change of the departure time and indicating a proposed departure time;

transmitting the proposal message to a terminal apparatus of the user;

in response to receiving from the terminal apparatus a message indicating approval of the proposed departure time, generating a vehicle dispatch command instructing that a vehicle be dispatched to the first place by the proposed departure time; and controlling, by transmitting the vehicle dispatch command to the vehicle, the vehicle to autonomously travel to the first place by the proposed departure time.

10. The information processing method of claim 9, wherein the predicting the state of congestion of the elevator includes predicting the state of congestion of the elevator based on an event that takes place in the building and/or a history of a past state of congestion of the elevator.

* * * * *